United States Patent
Faffelberger et al.

(10) Patent No.: US 10,274,151 B2
(45) Date of Patent: Apr. 30, 2019

(54) LIGHT GUIDING ELEMENT FOR AN ILLUMINATION UNIT

(71) Applicant: ZIZALA LICHTSYSTEME GMBH, Wieselburg (AT)

(72) Inventors: Anton Faffelberger, Krummnußbaum (AT); Bernd Eichinger, Krummnußbaum (AT)

(73) Assignee: ZKW Group GmbH, Wieselburg (AT)

( * ) Notice: Subject to any disclaimer, the term of this patent is extended or adjusted under 35 U.S.C. 154(b) by 306 days.

(21) Appl. No.: 15/123,480

(22) PCT Filed: Nov. 10, 2014

(86) PCT No.: PCT/AT2014/050269
§ 371 (c)(1),
(2) Date: Sep. 2, 2016

(87) PCT Pub. No.: WO2015/131212
PCT Pub. Date: Sep. 11, 2015

(65) Prior Publication Data
US 2017/0219178 A1    Aug. 3, 2017

(30) Foreign Application Priority Data
Mar. 4, 2014  (AT) ............... A 50161/2014

(51) Int. Cl.
*F21S 41/24*       (2018.01)
*F21S 43/237*      (2018.01)
(Continued)

(52) U.S. Cl.
CPC ............. *F21S 41/24* (2018.01); *B60Q 1/04* (2013.01); *F21S 43/14* (2018.01); *F21S 43/237* (2018.01);
(Continued)

(58) Field of Classification Search
CPC ........ F21S 41/24; F21S 43/237; F21S 43/247; F21S 43/50; F21S 43/14; F21S 43/27;
(Continued)

(56) References Cited

U.S. PATENT DOCUMENTS 4,208,363 A * 6/1980 Yevick ............. B29D 11/00278
264/1.24
5,422,792 A    6/1995 Neumann
(Continued)

FOREIGN PATENT DOCUMENTS

CN     103256564 A    8/2013
DE   102012202508 A1  9/2013
(Continued)

OTHER PUBLICATIONS

Office Action issued in Austrian Application No. A 50161/2014, dated Feb. 17, 2015 (3 pages).
(Continued)

*Primary Examiner* — Bryon T Gyllstrom
(74) *Attorney, Agent, or Firm* — Eversheds Sutherland (US) LLP (57) ABSTRACT

A light-guiding element (1) for a lighting unit, comprising a light-guiding body (5) having at least one light entry face (2) and at least one light exit face (3), wherein the at least one light entry face (2) comprises a plurality of entry sub-faces (2a) offset from one another at least in the light propagation direction (−x), wherein the entry sub-faces (2a) are oriented substantially normal to the light propagation direction (−x).

24 Claims, 5 Drawing Sheets

(51) Int. Cl.
*F21S 43/50* (2018.01)
*F21S 43/245* (2018.01)
*F21S 43/247* (2018.01)
*F21S 43/27* (2018.01)
*F21S 43/251* (2018.01)
*F21S 43/243* (2018.01)
*F21S 43/239* (2018.01)
*F21S 43/14* (2018.01)
*B60Q 1/04* (2006.01)
*F21V 8/00* (2006.01)

(52) U.S. Cl.
CPC ........... *F21S 43/239* (2018.01); *F21S 43/243* (2018.01); *F21S 43/245* (2018.01); *F21S 43/247* (2018.01); *F21S 43/251* (2018.01); *F21S 43/27* (2018.01); *F21S 43/50* (2018.01); *G02B 6/0076* (2013.01); *G02B 6/0088* (2013.01); *G02B 6/0008* (2013.01); *G02B 6/0016* (2013.01); *G02B 6/0036* (2013.01)

(58) Field of Classification Search
CPC ...... F21S 43/243; F21S 43/251; F21S 43/239; F21S 43/245; B60Q 1/04; G02B 6/0076; G02B 6/0088
USPC .......................................................... 362/511
See application file for complete search history.

(56) References Cited

U.S. PATENT DOCUMENTS

| | | | |
|---|---|---|---|
| 6,371,635 B2 | 4/2002 | Ott et al. | |
| 7,775,697 B2* | 8/2010 | Hirano | G02B 6/0036 362/511 |
| 8,206,017 B2* | 6/2012 | Zwick | G02B 6/0036 362/511 |
| 8,870,423 B2* | 10/2014 | Mihara | F21S 48/2268 362/511 |
| 8,882,316 B2* | 11/2014 | Natsume | B60Q 1/0052 362/511 |
| 9,134,474 B2* | 9/2015 | Lindsay | G02B 6/0006 |
| 9,349,926 B2 | 5/2016 | Maeda et al. | |
| 2006/0067084 A1* | 3/2006 | Stefanov | G02B 6/001 362/511 |
| 2011/0273901 A1* | 11/2011 | Nichol | G02B 6/002 362/581 |
| 2013/0201708 A1 | 8/2013 | Takahashi | |
| 2013/0201709 A1* | 8/2013 | Natsume | B60Q 1/00 362/511 |
| 2013/0314946 A1* | 11/2013 | Wilson | F21S 41/24 362/612 |

FOREIGN PATENT DOCUMENTS

| | | |
|---|---|---|
| EP | 2282340 A2 | 2/2011 |
| GB | 2277579 A | 11/1994 |
| JP | H05-83908 U | 11/1993 |
| JP | H09-180516 A | 7/1997 |
| JP | 2011-076858 A | 4/2011 |
| JP | 2012-155969 A | 8/2012 |
| JP | 2014-026829 A | 2/2014 |

OTHER PUBLICATIONS

International Preliminary Report on Patentability for PCT/AT2014/050269, dated Jul. 4, 2016 (16 pages).
First Office Action issued in Chinese Application No. 201480076548.2, dated Jun. 7, 2018 (2 pages).
Office Action issued in Japanese Application No. 2016-555344, dated Aug. 8, 2017 (6 pages).

* cited by examiner

LIGHT GUIDING ELEMENT FOR AN ILLUMINATION UNIT

The invention relates to a light-guiding element for a lighting unit, comprising a light-guiding body having at least one light entry face and at least one light exit face.

The invention also relates to a lighting unit, in particular a motor vehicle headlight, having at least one light-guiding element according to the invention. An additional aspect of the invention relates to a motor vehicle comprising at least one lighting unit according to the invention.

Light-guiding elements have the task of directing light from at least one light entry face to at least one light exit face. Here, light is deflected at the transition into the light-guiding element and out from the light-guiding element depending on the entry and exit angle and also the refraction index of the media at which the light enters and exits. This deflection influences the light distribution in the light-guiding element and also the light pattern produced by a light-guiding element. This means that light patterns produced by light-guiding elements can have significant inhomogeneities, which impair the function of the light-guiding element in some circumstances, for example when the light-guiding element forms part of an optical signalling device, such as a direction indicator (turn indicator), daytime running lights, or position light, or light emitted by the light-guiding element into a vehicle interior, and therefore a uniform light density distribution is of importance.

The object of the invention is therefore to create a light-guiding element with which the disadvantages of the prior art can be overcome and which enables a homogenous light distribution or a homogenous light pattern of the light emitted by the light-guiding element.

This object is achieved with a light-guiding element of the type mentioned in the introduction, in which, in accordance with the invention, the at least one light entry face comprises a plurality of entry sub-faces offset from one another at least in the light propagation direction, wherein the entry sub-faces are oriented substantially normal to the light propagation direction. Thanks to the invention, it is possible to create a light-guiding element which prevents undesirable inhomogeneities caused by light refraction and a change to the propagation direction of the light pattern, which can be produced easily and economically, and which in addition is extremely robust and nevertheless allows courses of the light entry face which deviate from a normal course relative to the light propagation direction.

The term "oriented substantially normal to the light propagation direction" is understood within the scope of this disclosure to mean that the orientation relative to the light propagation direction is at least between 85° and 95°, preferably 88° and 92°. Here, the light propagation direction corresponds to the main propagation direction of the light in the light-guiding element, in particular the direction of an optical axis. The entry sub-faces serve of course to allow light to enter the light-guiding element and are formed as flat faces. The offset can be in a positive or negative x-direction; this can conform to the course of a 3D carrier line.

Provision can preferably be made for adjacent entry sub-faces to border one another. This is not to be understood to mean that the adjacent entry sub-faces contact one another (this is not possible on account of the offset in the light propagation direction), but rather means that adjacent entry sub-faces are arranged such that projections of adjacent entry sub-faces would contact one another in a plane oriented parallel to the entry sub-faces. A particularly efficient arrangement of the entry sub-faces is thus provided.

In particular, provision can be made for adjacent entry sub-faces to be offset from one another in the light propagation direction. The entry sub-faces are all oriented substantially normal to the light propagation direction and consequently are also oriented substantially parallel to one another. An axis oriented normal to the entry sub-face is therefore oriented substantially parallel to the light propagation direction. All entry sub-faces adjacent to one another are preferably offset from the adjacent entry sub-faces in the light propagation direction. Light entry faces extending at an incline with respect to the light propagation direction (or any 3D curves) can thus be formed particularly easily and at the same time in an accurately shaped manner by a plurality of individual entry sub-faces oriented substantially normal to the light propagation direction.

An entry sub-face is in principle a flat face which is oriented substantially normal to the light propagation direction and which is delimited by bordering faces, for example wall faces, wherein the light entry face is composed of the sum of the entry sub-faces.

Provision can preferably be made for adjacent exit sub-faces to border one another. This is not to be understood to mean that the adjacent exit sub-faces contact one another (this is not possible on account of the offset in the light propagation direction), but rather means that adjacent exit sub-faces are arranged such that projections of adjacent exit sub-faces contact one another in a plane oriented parallel to the exit sub-faces. A particularly efficient arrangement of the exit sub-faces is thus provided.

In particular, provision can be made for adjacent exit sub-faces to be offset from one another in the light propagation direction. All exit sub-faces adjacent to one another are preferably offset from the adjacent exit sub-faces in the light propagation direction. Light exit faces extending in a slanting manner with respect to the light propagation direction can thus be formed particularly easily and at the same time in an accurately shaped manner by a plurality of individual exit sub-faces oriented substantially normal to the light propagation direction.

An exit sub-face is in principle a flat face which is oriented substantially normal to the light propagation direction and which is delimited by bordering faces, for example wall faces, wherein the light exit face is composed of the sum of the exit sub-faces. In principle, it would also be conceivable for the exit sub-faces to be formed not exactly flat, but for example to have a slight curvature. Here, it is important that the deviation from an exactly flat form is not so pronounced that a substantially normal orientation of the exit sub-faces relative to the light propagation direction is no longer possible.

In order to prevent undesirable re-directions of the light as it exits from the light-guiding element through the light exit face, provision can be made for the at least one light exit face to comprise a plurality of exit sub-faces offset from one another at least in the light propagation direction, wherein the exit sub-faces are oriented substantially normal to the light propagation direction. This improves the homogeneity of the light pattern emitted by the light-guiding element, in particular with light exit faces which are oriented at least partially in a slanting manner relative to the light propagation direction.

Provision can be made favourably for entry sub-faces bordering one another to be offset from one another by means of wall faces oriented parallel to the light propagation direction. This orientation of the wall faces reduces undesirable deflections or reflections at the wall faces so that light directed onto the light-guiding element can be coupled into the light-guiding element particularly efficiently through the light entry face. In practice, chamfers having an angle of up to 2° with respect to the propagation direction can also be provided for manufacturing reasons.

Provision can also be made for exit sub-faces bordering one another to be offset from one another by means of wall faces oriented parallel to the light propagation direction. This orientation of the wall faces reduces undesirable deflections or reflections at the wall faces so that the light exiting through the light exit face can be emitted from the light-guiding element particularly efficiently and homogenously.

In a favourable variant of the invention, individual or all wall faces can be substantially horizontally oriented, whereby complex shapes of the light entry and/or the light exit faces can be formed. The term "individual wall faces" generally designates a number of wall faces, wherein this number can be one, two, three, or more than three.

Alternatively, individual or all wall faces can be substantially vertically oriented. By way of example, it is thus possible to provide a horizontal bevel of the light entry and/or the light exit faces with respect to the light propagation direction, as is typically provided for example in the case of motor vehicle headlights in a modern vehicle on account of the wedge shape of the vehicle front.

In another variant of the invention, provision can be made on the other hand for individual or all wall faces to be oriented substantially normal to a normal projection of a carrier curve, wherein the normal projection of the carrier curve extends in a plane oriented at right angles with respect to the light propagation direction (−x). The light-guiding element is shaped here such that it follows the course of the carrier curve, or the carrier curve is incorporated in the light-guiding element. The carrier curve does not necessarily have to lie in a plane, but in principle can have an arbitrary course.

The specifications "horizontally", "vertically" and diagonally" relate here to a typical installed position of the light-guiding element, in which the light propagation direction extends in a horizontal direction. This does not rule out the fact that the light-guiding element can also be installed such that a light propagation direction is vertically oriented, for example.

In another development of the invention, provision can be made for a cube-shaped structure to be formed by the wall faces. This makes it possible to form light entry and/or light exit faces that are slanted both in a horizontal direction and in a vertical direction.

In order to additionally increase the homogeneity of the light pattern of the light emitted by the light-guiding element, provision can be made for the edges formed at the transition of the wall face to the entry and/or exit sub-face to be rounded, wherein the rounded portion has a radius between 0.05 and 0.3 mm, preferably 0.15 mm. Light impinging on the rounded portion is thus scattered, whereby for example transitions between the individual wall faces are not visible in the light pattern of the light-guiding element.

In order to avoid undesirable deflections of the light beams entering the light-guiding element and exiting the light-guiding element, provision can be made for the exit sub-faces to be oriented substantially parallel to the entry sub-faces. The term "substantially parallel" here means that the orientations deviate from one another at most by an angle of 5°, preferably 3°, particularly preferably 2°.

In order to enable a sufficiently fine gradation of the light entry face, provision can be made for the entry sub-faces to have an extension in the horizontal direction of at most 2.5 mm, preferably between 1 mm and 2.5 mm.

In order to enable a sufficiently fine gradation in the light exit face, provision can be made for the exit sub-faces to have an extension in the horizontal direction of at most 2.5 mm, preferably between 1 mm and 2.5 mm. Horizontal bevels of the light exit face of the light-guiding element can thus be resolved in a particularly fine manner and therefore are hardly visible to a viewer.

Provision can also be made for the entry sub-faces to have an extension in the vertical direction of at most 2.5 mm, preferably between 1 and 2.5 mm, and/or for the exit sub-faces to have an extension in the vertical direction of at most 2.5 mm, preferably between 1 mm and 2.5 mm.

The light body can be formed advantageously as a solid body, whereby a more economical and more robust structure of the light-guiding element is created.

In particular, the light body can consist of polycarbonate and/or poly methyl methacrylate, since these materials have particularly advantageous light-guiding properties.

The light-guiding element according to the invention can be installed in particular in a lighting unit, in particular in a motor vehicle headlight, wherein the lighting unit advantageously comprises at least one light-coupling-in element, preferably a light rod, which is arranged in front of the light entry face of the light-guiding element. Here, an arrangement "in front of the light entry face" means that the light-coupling-in element is arranged against the light propagation direction of the light-guiding element in the immediate vicinity of the light-guiding element so that the light can be coupled into the light-entry face of the light-guiding element through the light-coupling-in element. The light-coupling-in element can comprise light sources or can be fed by light sources. Such light sources can be LEDs, for example.

In a further aspect the invention relates to a motor vehicle comprising at least one lighting unit according to the invention.

The invention will be explained in greater detail hereinafter on the basis of the exemplary and non-limiting embodiments shown in the drawings, in which.

Hereinafter, unless specified otherwise, like reference signs designate the same features, which additionally have the same properties.

Figure 1:
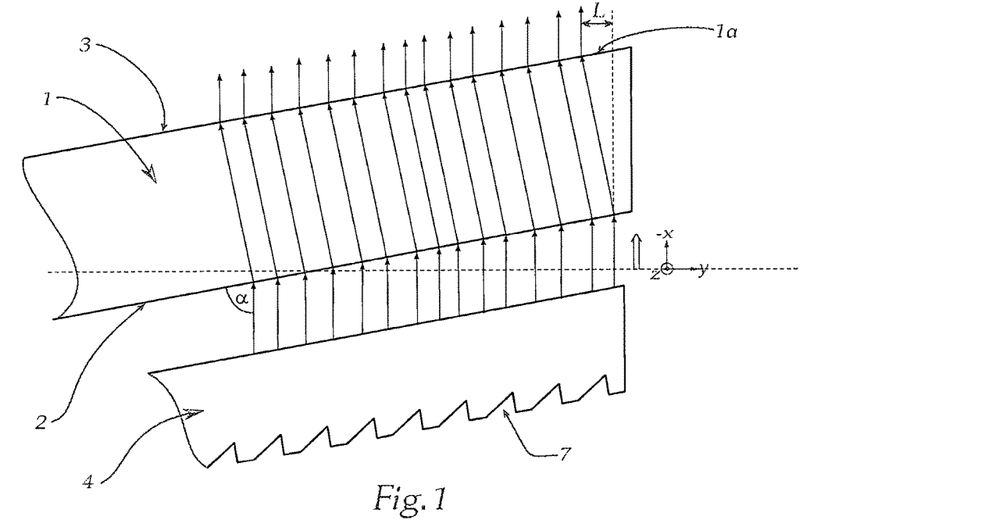
FIG. 1 shows a schematic illustration of a light-guiding element according to the prior art.

FIG. 1 shows a schematic illustration of a light-guiding element 1 according to the prior art. The light-guiding element 1 has a light entry face 2 and a light exit face 3, wherein a light-coupling-in element 4 is arranged in front of the light-guiding element 1. The light beams are coupled into the light-guiding element 1 by the light-coupling-in element 4 via the light entry face 2 in the direction of a light propagation direction –x (in the drawings a right-handed Cartesian coordinate system has been selected in which the x-axis is oriented against the direction of travel of a vehicle and the z-axis is oriented vertically) of an optical axis which for example is oriented in the direction of a vehicle longitudinal axis, wherein the light beams here impinge on the light entry face 2 at an angle $\alpha$ deviating from 90°, for example $\alpha$=80°–the light entry face 2 in the shown example is therefore inclined by 10° with respect to a plane oriented normal to the light propagation direction. At the transition between different optical media having deviating optical densities (refractive indices), light beams which do not impinge perpendicularly on an interface disposed between the media are deflected in accordance with the laws of physics. In the present example according to FIG. 1, the light beams are refracted relative to the perpendicular upon entry into the light-guiding element 1 and are refracted relative to the perpendicular upon exit from the light-guiding element 1. Since the light exit face 3 is oriented parallel to the light entry face 2 and these are surrounded by the same medium, the degree of the deflection of the light beams upon entry into the light-guiding element 1 matches the degree of deflection upon exit from the light-guiding element 1. Consequently the beams, following the exit from the light-guiding element 1, are oriented exactly the same as before the entry into the light-guiding element 1, wherein the light beams have been shifted along here by the length L. This shift causes the light-guiding element 1 to have a darkened region 1a, which is not reached by the incoming light beams and therefore appears dark. This inhomogeneity in the light pattern of the light-guiding element 1 is disadvantageous and problematic in respect of many functions for which light-guiding elements could otherwise be used.

Figure 2:
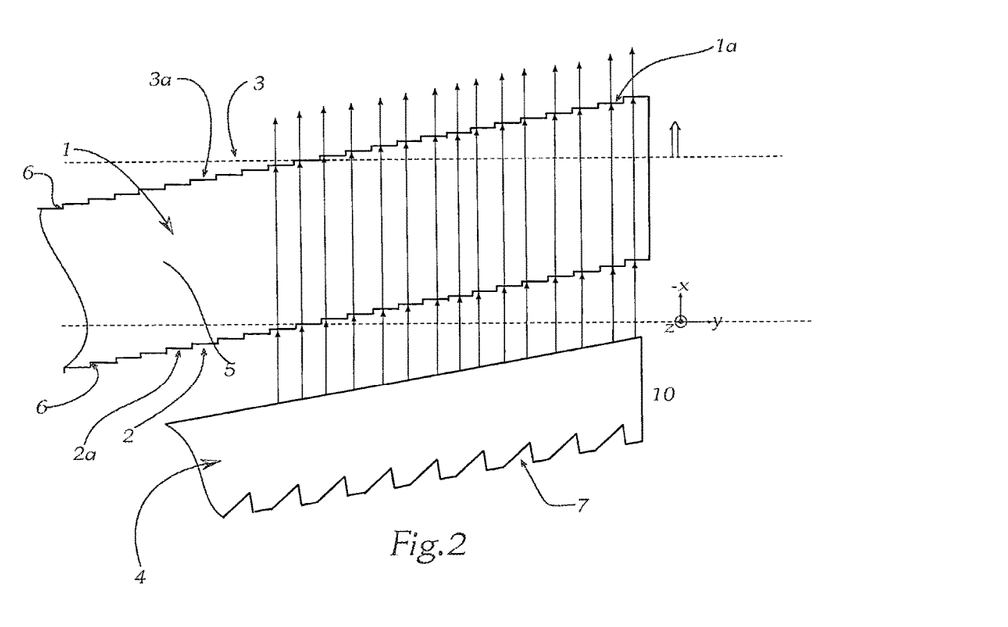
FIG. 2 shows a schematic illustration of a light-guiding element in accordance with a first embodiment of the invention.

FIG. 2 shows a schematic illustration of a light-guiding element 1 in accordance with a first embodiment of the invention. The light-guiding element 1 here comprises a light-guiding body 5, wherein this body is preferably formed as a transparent solid body, which for example may comprise polycarbonate and/or poly methyl methacrylate. The light-guiding element 1 comprises a light entry face 2 and a light exit face 3, which is opposite the light entry face 2. In contrast to the light entry and exit faces of the prior art, the light entry face 2 comprises a plurality of individual entry sub-faces 2a, and the light exit face 3 comprises a plurality of individual exit sub-faces 3a, which are offset from one another at least in the light propagation direction –x, wherein both the entry sub-faces 2a and the exit sub-faces 3a are oriented substantially normal to the light propagation direction –x. The term "a plurality" is understood here to mean a number of at least two, preferably at least three, four, or also many more, for example at least ten, twenty, or more than thirty entry and/or exit sub-faces 2a and 3a.

Adjacent exit sub-faces 3a border one another here, wherein these are offset from one another in the light propagation direction –x. The offset is provided via wall faces 6 oriented parallel to the light propagation direction –x. Similarly to FIG. 1, light is coupled in the shown example into the light entry face 2 of the light body 5 via a light-coupling-in element 4 and is emitted by the light-guiding element 1 via the light exit face 3 (or exit sub-faces 3a). The entry and exit sub-faces 2a and 3a oriented substantially normal to the light propagation direction –x cause light beams entering the light body 5 of the light-guiding element 1 to impinge at right angles on the faces and therefore not to be deflected. This leads to a uniform light distribution in the light body 5 and prevents undesirable deflections in the propagation in the light-guiding element 1. In contrast to the light-guiding element 1 according to FIG. 1, the region 1a is now illuminated uniformly and brightly. The light-coupling-in element 4 arranged in front of the light-guiding element 1 typically comprises light-scattering elements 7, in particular deflecting prisms, for the purpose of deflecting light beams toward the light entry face 2.

In the embodiment according to FIG. 2, the wall faces 6 are oriented substantially vertically. It is thus possible to form the light entry face 2 in a slanting manner in the horizontal direction. This is true equally for the light exit faces 3. Such bevels are of significance in particular in the case of light-guiding elements 1 which must be designed in a wide range of different geometric shapes, for example in order to meet design specifications and/or enable a certain design of other modules engaged with the light-guiding element 1. By way of example, in the case of a light-guiding element 1 installed in a motor vehicle headlight, a bevel can be provided in the direction of travel (since the vehicle fronts of modern motor vehicles often have a wedge shape, the vehicle headlights are no longer oriented normal, but instead at a slant to the direction of travel), wherein the light beams typically still have to be emitted in the direction of travel. In such cases it is therefore necessary to orientate the light entry face 2 and the light exit face 3 at a slant to the light propagation direction –x. On account of the sub-faces 2a and 3a offset from one another in the direction of the light propagation direction –x and oriented substantially normal to the light propagation direction –x, it is possible to form the light entry face 2 and the light exit face 3 at a slant to the light propagation direction -x (since the particular face 2 or 3 comprises a plurality of individual sub-faces 2a or 3a offset from one another) and thereby to simultaneously avoid undesirable deflections of light beams.

Figure 8:
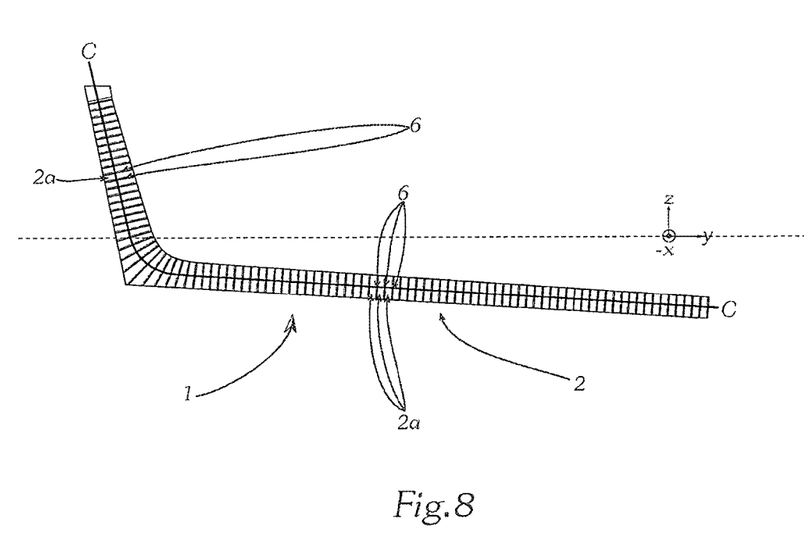
FIG. 8 shows a plan view of the light entry sub-faces 2*a* of the light-guiding element 1 in accordance with the third embodiment of the invention.

In the first embodiment of the invention the wall faces 6 are vertically oriented, whereby a horizontal slanting of the light entry and light exit face 2 and 3 can be implemented in a simple manner. Alternatively, the wall faces 6 could also be oriented horizontally, whereby a bevel in the vertical direction can be provided. The embodiment of the light entry face 2 does not necessarily have to match the embodiment of the light exit face 3. The wall faces 6 could also be oriented diagonally, that is to say neither horizontally nor vertically. The wall faces 6 can also be oriented substantially normal to a normal projection of a 3D carrier curve in a plane spanned by the axes z and y, which is illustrated in FIG. 8. The carrier curve C is incorporated within the light-guiding element 1, wherein the shape of the light-guiding element 1 follows the course of the carrier curve C. The edges formed at the transition of the particular wall face 6 to the entry and/or exit sub-face 2a and 3a are preferably rounded, wherein the rounded portion has a radius between 0.05 and 0.3 mm, preferably 0.15 mm. In order to be able to provide the finest possible gradation of a slant, provision can be made for the entry sub-faces and/or exit sub-faces 2a, 3a to have an extension in the horizontal direction of at most 2.5 mm, preferably between 1 mm and 2.5 mm.

The light-guiding element 1 has a light-conducting outer face 8, which extends from the light entry face 2 to the light exit face 3. Although in FIG. 2 only one side of the outer face 8 is visible, the entire area disposed between the light entry and the light exit face 2, 3 is in principle represented by the outer face 8.

Figure 3:
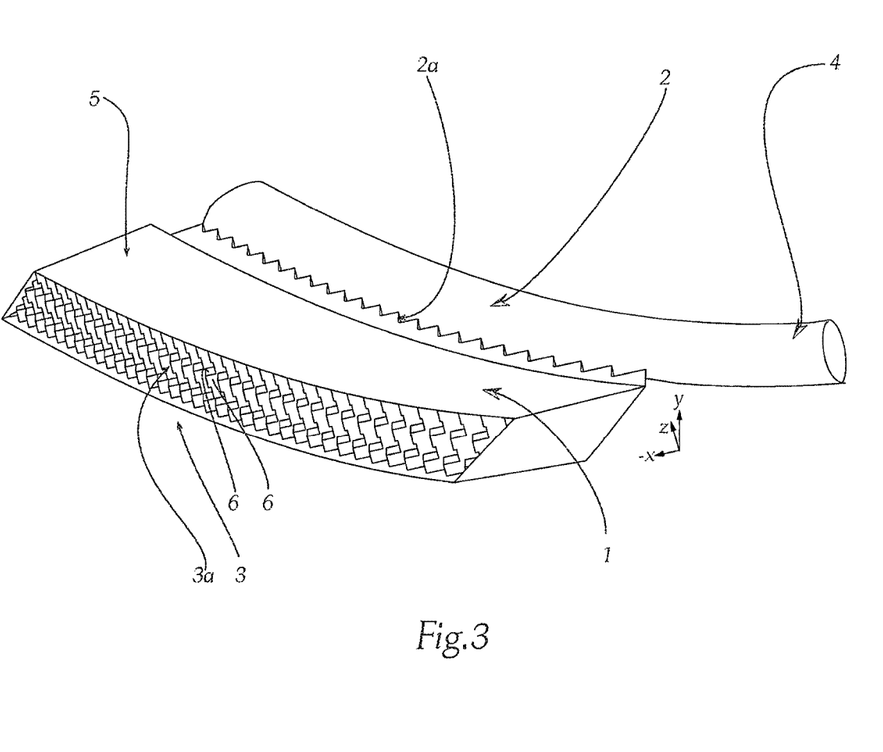
FIG. 3 shows a perspective illustration of a light-guiding element in accordance with a second embodiment of the invention.

FIG. 3 shows a perspective illustration of a light-guiding element 1 in accordance with a second embodiment of the invention. In this figure a light-coupling-in element 4 is arranged in front of the light body 5 of the light-guiding element 1, wherein the light exit face 3 again has exit sub-faces 3a which in the shown example have a somewhat more complex structure, wherein adjacent exit sub-faces 3a are offset from one another in the light propagation direction −x by means of diagonal wall faces 6.

Figure 3A:
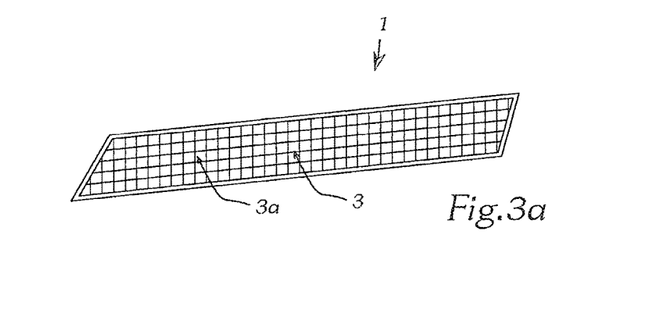
FIG. 3*a* shows a front view of the light-guiding element in accordance with the second embodiment of the invention.

FIG. 3 shows a front view of the light-guiding element according to the second embodiment of the invention. In this figure the light-guiding element 1 or the light body 5 of the light-guiding element 1 is illustrated in a front view showing a light exit face 3 comprising a multiplicity of individual light exit sub-faces 3a forming a cube-shaped structure in which the exit sub-faces 3a are arranged in rows and columns, wherein adjacent exit sub-faces 3a are offset from one another.

Figure 4:
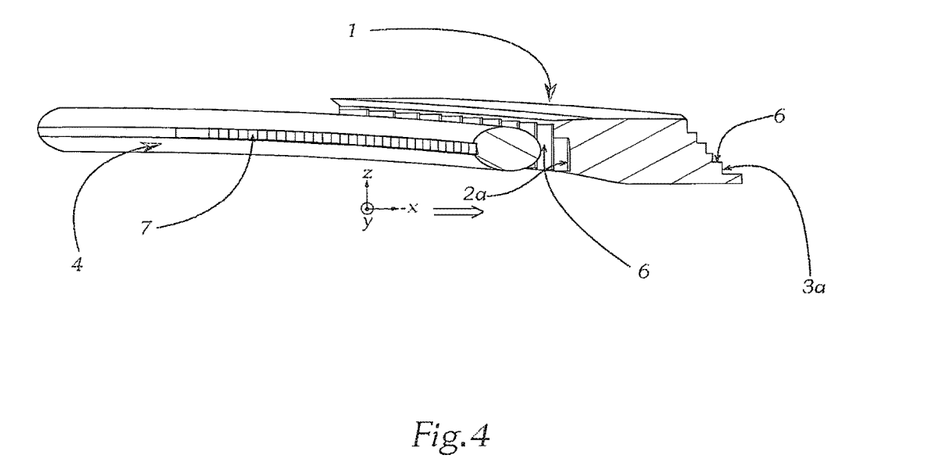
FIG. 4 shows a perspective rear view of a light-guiding element in accordance with a third embodiment of the invention with a light rod arranged in front.

FIG. 4 shows a perspective rear view of a light-guiding element 1 in accordance with a third embodiment of the invention with a light rod 4 arranged in front. In this example the entry sub-faces 2a are offset from one another in the direction of the light propagation direction −x by vertical wall faces 6. The exit sub-faces 3a are by contrast offset from one another both by horizontally and vertically oriented wall faces 6, whereby a cube-shaped structure is created (see FIG. 7), with which a vertical and a horizontal slanting of the light exit face 3 is provided.

Figure 5:
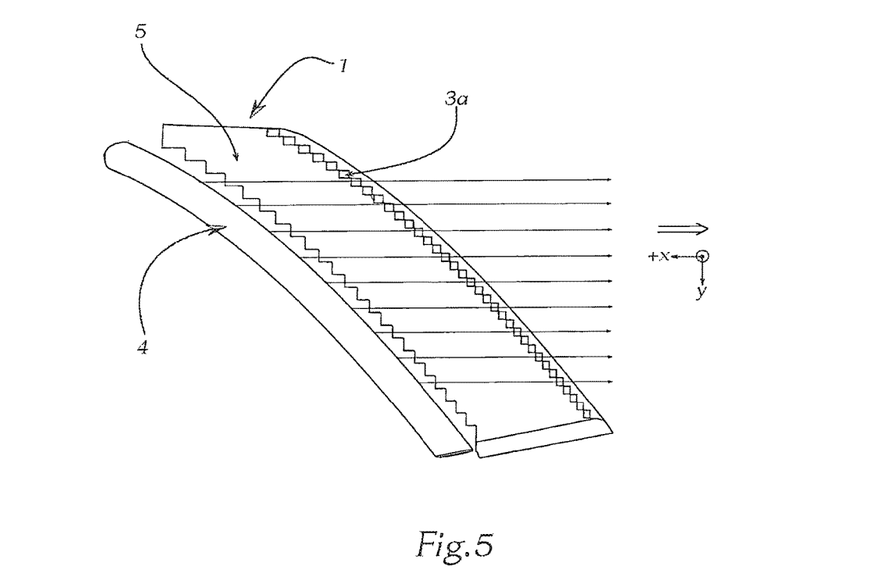
FIG. 5 shows a plan view of a light-guiding element in accordance with the invention with indicated beam path of the light beams.
Figure 6:
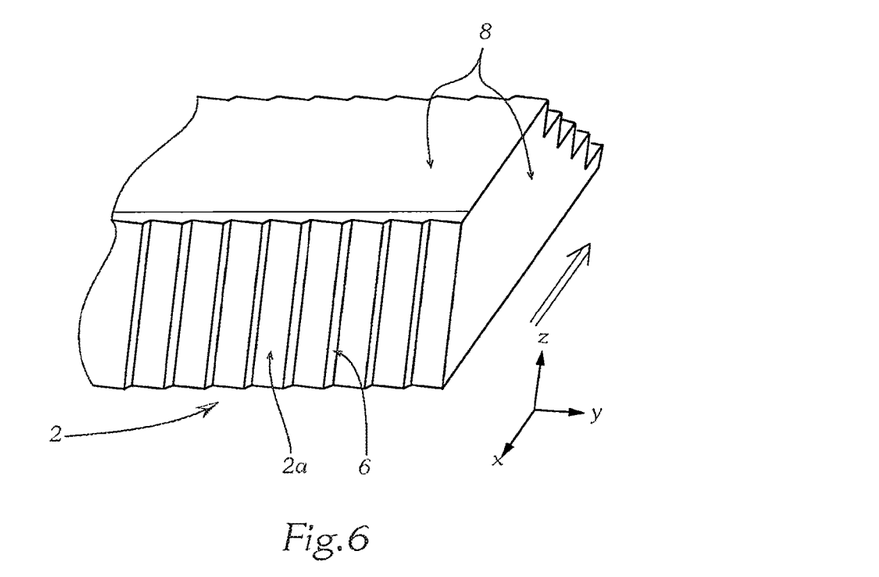
FIG. 6 shows a detail of the light entry face of the light-guiding element in accordance with the third embodiment of the invention.
Figure 7:
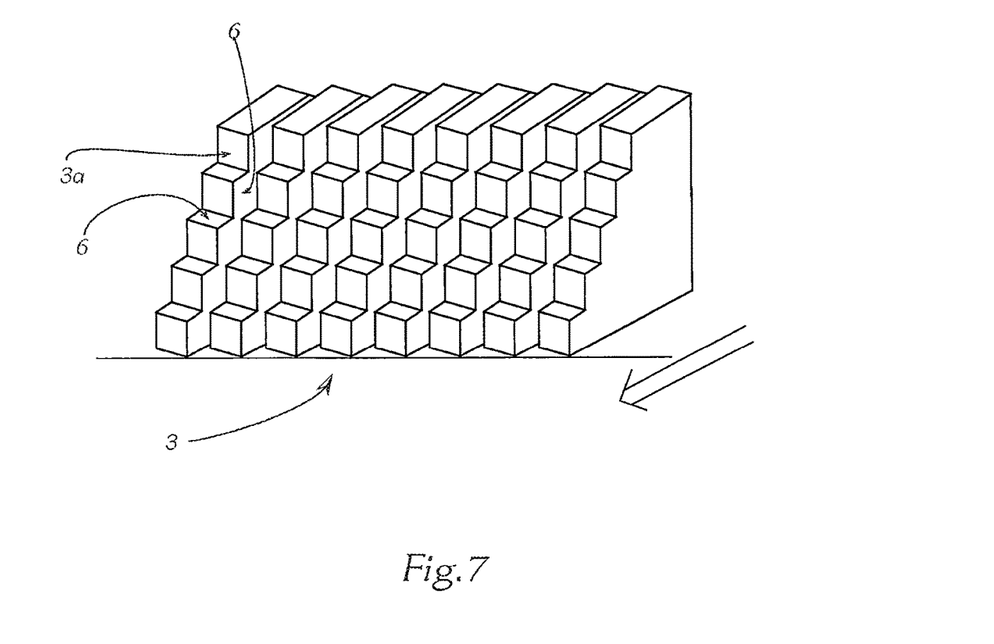
FIG. 7 shows a detail of the light exit face of the light-guiding element in accordance with the third embodiment of the invention.

FIG. 5 shows a plan view of a light-guiding element 1 in accordance with the third embodiment of the invention with a beam path of the light beams illustrated therein by way of example. FIG. 6 shows a detail of the light entry face 2 of the light-guiding element 1 in accordance with the third embodiment of the invention. In this figure the vertical wall portions 6 can be clearly seen, by means of which the entry sub-faces 2a are offset from one another, thus creating a horizontal slanting of the light entry face 2. FIG. 7 shows a detail of the light exit face 3 of the light-guiding element 1 in accordance with the third embodiment of the invention, in which the light exit face 3 has a step-shaped structure, in which adjacent exit sub-faces 3a are offset from one another in the aforementioned manner by means of horizontal and vertical wall faces 6 in the direction of the light propagation direction −x (or of course also against the light propagation direction −x), whereby a stepped structure is formed, which is staggered in the y- and z-direction. The offset in and against the light propagation direction −x can, in principle, be selected freely in accordance with the lighting requirements. The wall faces are oriented substantially parallel to the light propagation direction −x. In this third embodiment of the invention each entry sub-face 2a is thus assigned a "column" of light exit sub-faces 3a (in the shown embodiment each light entry face 2a is assigned five light exit sub-faces 3a arranged one above the other).

FIG. 8 shows a plan view of the light entry sub-faces 2a of the light-guiding element 1 in accordance with the third embodiment of the invention. In this figure a carrier curve C can be seen, which can be predefined by a lighting engineer and which determines the shape of the light-guiding element 1. The wall faces 6 are oriented normal to a normal projection of the carrier curve C in a plane oriented normal to the light propagation direction −x. The projection plane thus lies in a plane spanned by the axes z and y. The carrier curve C does not necessarily have to lie in a plane, but in principle can have an arbitrary course.

In view of this teaching, the invention can be modified in any manner known to a person skilled in the art and therefore is not limited to the presented embodiments. Individual aspects of the invention or of the presented embodiments can also be selected and combined with one another. The concepts forming the basis of the invention and which can be carried out by a person skilled in the art in various ways in the knowledge of this description and nevertheless remain maintained as such are essential.

The invention claimed is:

1. A lighting unit, in particular a motor vehicle headlight, comprising:
   at least one light-guiding element (1) for the lighting unit; and
   at least one light-coupling-in element formed as a light rod (4),
   wherein:
   the light-guiding element (1) comprises a light-guiding body (5) having at least one light entry face (2) and at least one light exit face (3),
   the at least one light entry face (2) comprises a plurality of entry sub-faces (2a) offset from one another at least in the light propagation direction (−x),
   the entry sub-faces (2a) are oriented substantially normal to the light propagation direction (−x), wherein adjacent entry sub-faces (2a) border one another,
   the entry sub-faces (2a) bordering one another are offset from one another by means of wall faces (6) oriented parallel to the light propagation direction (−x), and
   the light rod (4) is arranged in front of the light entry sub-face (2).

2. The lighting unit of claim 1, wherein adjacent entry sub-faces (2a) are offset from one another in the light propagation direction (−x).

3. The lighting unit of claim 1, wherein the at least one light exit face (3) comprises a plurality of exit sub-faces (3a) offset from one another at least in the light propagation direction (−x), wherein the exit sub-faces (3a) are oriented substantially normal to the light propagation direction (−x).

4. The lighting unit of claim 3, wherein adjacent exit sub-faces (3a) border one another.

5. The lighting unit of claim 3, wherein adjacent exit sub-faces (3a) are offset from one another in the light propagation direction (−x).

6. The lighting unit of claim 3, wherein entry sub-faces (2a) bordering one another are offset from one another by means of wall faces (6) oriented parallel to the light propagation direction (−x).

7. The lighting unit of claim 3, wherein the exit sub-faces (3a) are oriented substantially parallel to the entry sub-faces (2a).

8. The lighting unit of claim 3, wherein the exit sub-faces (3a) have an extension in the horizontal direction of at most 2.5 mm.

9. The lighting unit of claim 8, wherein the extension in the horizontal direction is between 1 mm and 2.5 mm.

10. The lighting unit of claim 3, wherein the exit sub-faces (3a) have an extension in the vertical direction of at most 2.5 mm.

11. The lighting unit of claim 10, wherein the extension in the vertical direction is between 1 mm and 2.5 mm.

12. The lighting unit of claim 1, wherein individual wall faces (6) are oriented substantially horizontally.

13. The lighting unit of claim 1, wherein individual wall faces (6) are oriented substantially vertically.

14. The lighting unit of claim 1, wherein individual wall faces (6) are oriented substantially normal to a normal projection of a carrier curve (C), wherein the normal projection of the carrier curve (C) extends in a plane oriented at right angles with respect to the light propagation direction (−x).

15. The lighting unit of claim 1, wherein a cube-shaped structure is formed by the wall faces (6).

16. The lighting unit of claim 1, wherein the edges formed at the transition of the wall face (6) to the entry and/or exit sub-face (2a, 3a) are rounded, wherein the rounded portion has a radius between 0.05 and 0.3 mm.

17. The lighting unit of claim 16, wherein the rounded portion has a radius of 0.15 mm.

18. The lighting unit of claim 1, wherein the entry sub-faces (2a) have an extension in the horizontal direction of at most 2.5 mm.

19. The lighting unit of claim 18, wherein the extension in the horizontal direction is between 1 mm and 2.5 mm.

20. The lighting unit of claim 1, wherein the entry sub-faces (2a) have an extension in the vertical direction of at most 2.5 mm.

21. The lighting unit of claim 20, wherein the extension in the vertical direction is between 1 mm and 2.5 mm.

22. The lighting unit of claim 1, wherein the light body (5) is formed as a solid body.

23. The lighting unit of claim 1, wherein the light body (5) consists of polycarbonate and/or poly methyl methacrylate.

24. A motor vehicle comprising at least one lighting unit of claim 1.

* * * * *